United States Patent [19]
Smith et al.

[11] 3,896,618
[45] July 29, 1975

[54] SYSTEM FOR PROVIDING AUXILIARY POWER

[75] Inventors: William E. Smith, Climax; Charles J. Bowden, Galesburg, both of Mich.

[73] Assignee: General Signal Corporation, Rochester, N.Y.

[22] Filed: May 31, 1974

[21] Appl. No.: 475,212

[52] U.S. Cl. .................................. 60/405; 60/456
[51] Int. Cl. .................... F15b 20/00; F15b 21/04
[58] Field of Search ............. 60/403, 404, 405, 455, 60/456

[56] References Cited
UNITED STATES PATENTS

| | | | |
|---|---|---|---|
| 3,434,282 | 3/1969 | Shelhart | 60/405 |
| 3,631,937 | 1/1972 | Joyce | 60/405 X |
| 3,696,613 | 10/1972 | Goodale | 60/404 |
| 3,747,725 | 7/1973 | Feustel et al. | 60/405 X |

*Primary Examiner*—Edgar W. Geoghegan
*Attorney, Agent, or Firm*—Jeffrey S. Mednick

[57] ABSTRACT

A system for providing auxiliary power comprises a primary circuit including a primary pump, an output line for providing primary power, and a return line. An auxiliary circuit includes an auxiliary pump, an output line for providing the auxiliary power and a return line. The auxiliary circuit also includes a valve for controlling fluid flow in the output and return line of the auxiliary circuit. A reservoir is connected to the primary return line and to the auxiliary return line. A controlled leakage apparatus for cooling the auxiliary pump is connected to the auxiliary circuit, the reservoir and the primary circuit, and in response to a predetermined pressure in the primary circuit directs a portion of auxiliary output fluid to the reservoir. Approximately all of the auxiliary output fluid is directed to the auxiliary output line when the primary circuit provides less than the predetermined pressure. The auxiliary circuit includes a drive apparatus connected to a vehicle for operating the auxiliary pump whenever the vehicle is moving.

7 Claims, 8 Drawing Figures

PATENTED JUL 29 1975

3,896,618

SHEET 1

SYSTEM FOR PROVIDING AUXILIARY POWER

BACKGROUND OF THE INVENTION

While the invention is subject to a wide range of applications, it is especially suited for use in a vehicle power steering system and will be particularly described in that connection.

In hydraulic power steering systems of vehicles, the general practice is to have a primary steering pump driven by the vehicle engine and supplying hydraulic fluid to a steering valve which is controlled by a steering wheel. In the event of a failure of the primary pump, fluid is not supplied to the steering valve and manual steering of the vehicle is extremely difficult. Assuming the failure occurs to a large, off-road, mobile construction machine, the operator may be in a hazardous position because of the extreme difficulty in steering due to the loss of power. Consequently, it is a well-known expedient to include a backup system capable of supplying sufficient power to a steering valve in the event of a primary power failure and thereby enable an operator to safely steer the crippled vehicle.

In the past, one attempt to solve the abovementioned problem was to provide a back-up system which stored emergency fluid in an accumulator. In this type of system, a pressurized accumulator, for example, a cylinder of oil, delivers fluid to a steering valve in the event that the primary pump fails to supply the necessary fluid. Accumulator systems are expensive due to the complex apparatus required. Further they are unreliable as they sit idle whenever the primary pump is working properly, and when the accumulator is finally needed, an unseen defect in the system can easily have occured. Additionally, accumulators are not practical for providing steering during long distance moving of vehicles which have lost their primary power.

Another solution to the problem of steering failure is the addition of a backup system including a ground driven pump. This pump, driven directly or indirectly by the vehicle wheels, is automatically connected to the steering valve upon failure of the primary pump or the hydraulic circuitry connected thereto. An example of a ground drive pump system is disclosed in U.S. Pat. No. 3,746,725 to Van Wicklin et al. This patent discloses, for example, "in accordance with the present invention, a vehicle power steering system having a primary and a secondary or an auxiliary pump includes a transfer valve for altering the fluid flow circuits of the primary and auxiliary pumps.....Should the mass flow rate become insufficient in magnitude, the transfer valve disconnects the primary hydraulic supply circuit from the steering assist mechanism and connects the auxiliary hydraulic supply circuit to the steering assist mechanism so that power assisted steering is retained." The auxiliary pump disclosed in this patent is always delivering its total output to the transfer valve whenever a vehicle, which includes this system, is moving.

The problem with a system of the type disclosed above is that a significant hydraulic horsepower loss is created by the flow of hydraulic fluid from an auxiliary pump through a transfer valve. The following equation for hydraulic horsepower loss may be derived from the SAE Handbook, 1973, Procedure J 745 C:

$$HHL = \frac{P \times Q}{1714}$$

where:
$HHL$ = Hydraulic Horsepower Loss
$P$ = Differential Pressure (psi)
$Q$ = Flow Rate (gpm)

Thus, a hydraulic horsepower loss is present whenever a fluid from an auxiliary pump crosses a differential pressure in the flow path, such as, for example, the differential pressure across a transfer valve. In a system of the type where the auxiliary pump is always delivering its total output to a transfer valve, the horsepower loss may be significant. With the increased cost in fuel, efficiency of a machine becomes very important.

Another disadvantage of many prior art ground drive pump systems is the complexity of the apparatus. The transfer valve is a separate unit which may receive an input flow from both a main pump and an auxiliary pump and directs the output flow to the proper location. Thus, a transfer valve is relatively large and requires some extensive plumbing for installation. Also, a reservoir in this type of system requires a capacity to handle the total supply capabilities of both pumps.

Another example of a ground drive pump steering system is disclosed in U.S. Pat. No. 3,631,937 to Joyce. This patent discloses, for example, "a supplementary steering system for use with the primary hydraulic steering system of a vehicle having a steering valve. The supplementary steering system includes a supplementary pump driven by the driven shaft of the vehicle and a supplementary valve that discharges the output of the supplementary pump in the right direction to the steering valve regardless of the direction of the rotation of the supplementary pump so that supplementary hydraulic fluid is available for use in steering so long as the vehicle is moving and even when the engine of the vehicle is not in operation." One major difference between the Joyce patent and the present disclosure is that the supplementary pump of Joyce is always directing fluid to the steering valve whenever the vehicle is moving. In the present disclosure, the auxiliary pump does not deliver fluid to the steering valve unless the primary pump is not providing fluid at a predetermined pressure to the valve.

It is an object of the present invention to provide a ground drive safety steer pump circuit which has a low horsepower reduction loss.

It is a further object of the present invention to provide a system for providing auxiliary power which is compact.

It is a further object of the present invention to provide a system for providing auxiliary power which is relatively easy to install.

It is a further object of the present invention to provide a system for providing auxiliary power which is efficient.

It is a further object of the present invention to provide a system for providing auxiliary power which is inexpensive to manufacture.

SUMMARY OF THE INVENTION

In accordance with the present invention, a system for providing auxiliary power comprises a primary circuit including a primary pump, an output line for providing primary power, and a return line. An auxiliary circuit includes an auxiliary pump, an output line for providing said auxiliary power and a return line. The auxiliary circuit includes a valve for controlling fluid flow in the output and return lines of the auxiliary circuit. A reservoir is connected to both the primary return line and the auxiliary return line. A controlled leakage apparatus for cooling the auxiliary pump is connected to the auxiliary circuit, the reservoir and primary structure. The controlled leakage apparatus directs a portion of auxiliary output fluid to the reservoir when the primary circuit provides a predetermined pressure and directs substantially all of the auxiliary output fluid to the auxiliary output line when the primary circuit provides less than the predetermined pressure.

To be more specific, the system may include a primary circuit which includes a primary pump, an output line for providing primary power to a vehicle and a return line. An auxiliary circuit includes an auxiliary pump, an output line for providing auxiliary power and a return line. A drive mechanism operates the auxiliary pump whenever the vehicle is moving. The improvement comprises a horsepower loss reduction apparatus for allowing the auxiliary structure to provide the auxiliary power only when the primary pump fails to provide a predetermined amount of power.

For a better understanding of the present invention, together with other and further objects thereof, reference is made to the following description, taken in connection with the accompanying drawings, while its scope will be pointed out in the appended claims.

DESCRIPTION OF THE PREFERRED EMBODIMENTS

A system for providing auxiliary power comprises a primary circuit 20 including a primary pump 22, an output line 24 to provide primary power for a work function area 30, and a line 26 connecting pump inlet and reservoir. An auxiliary circuit 60 includes an auxiliary pump 62, an output line 64 for providing auxiliary power to a work function area 30, and a return line 66 connecting a valve 80 with a reservoir 125. The auxiliary circuit 60 includes valve 80 for controlling fluid flow in the auxiliary output and return lines 64 and 66. A reservoir 125 is connected to primary return line 26 and auxiliary return line 66. A controlled leakage circuit 130 is connected to auxiliary circuit 60, reservoir 125, and primary circuit 20. Controlled leakage circuit 130 functions to cool auxiliary pump 62 and is responsive to fluid pressure in primary circuit 20 to direct a portion of auxiliary pump output fluid to reservoir 125 when primary circuit 20 provides a predetermined pressure and directs substantially all of the auxiliary pump output fluid to auxiliary output line 64 when primary circuit 20 provides less than the predetermined pressure.

Figure 1:
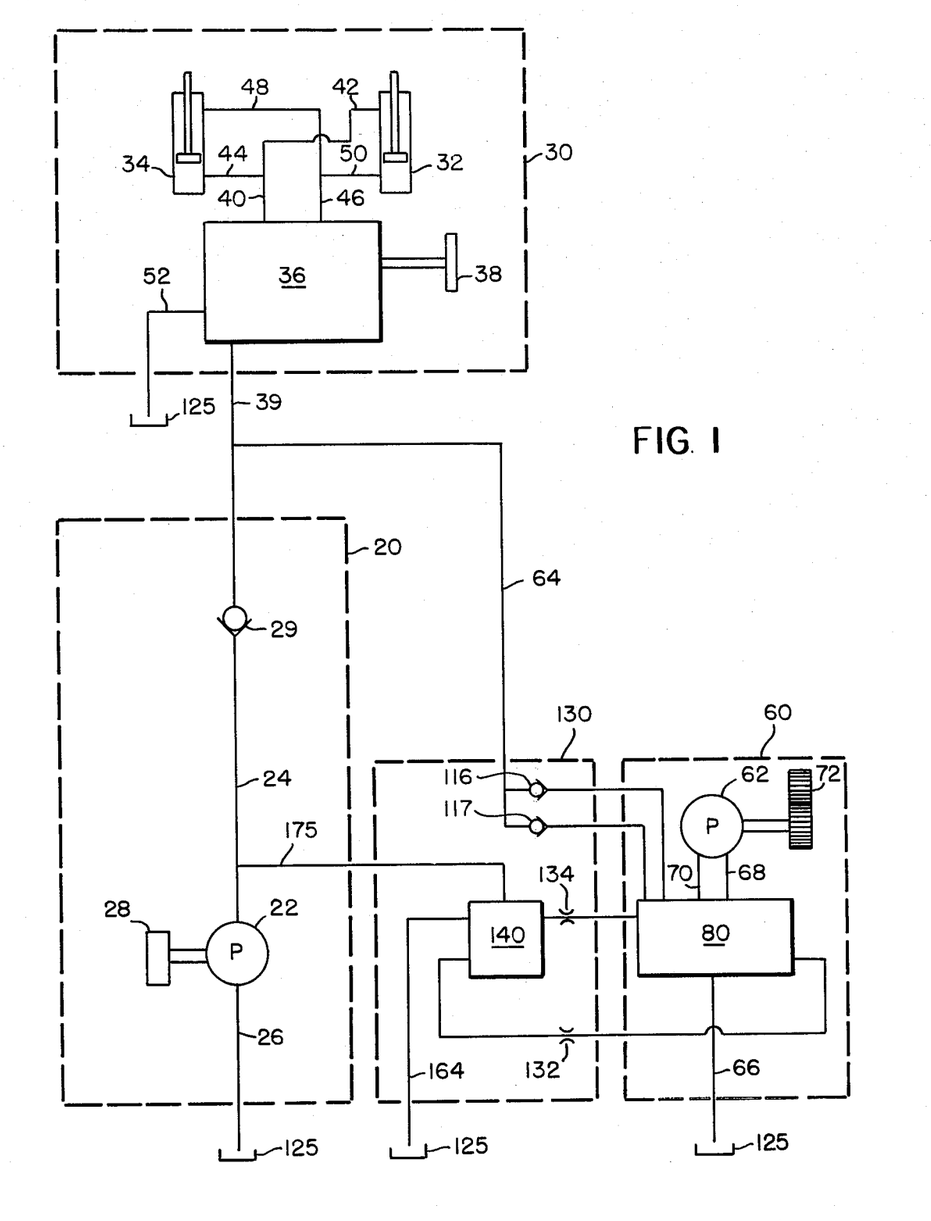
FIG. 1 is a schematic illustration of a first embodiment of a system for providing auxiliary power.

Referring to FIG. 1, there is shown a schematic illustration of a motor vehicle power steering system having the components which may be utilized in practising the invention. The auxiliary circuit 60 is adapted to be used in conjunction with a primary power circuit 20 for any vehicle that requires power steering, particularly large equipment such as the well-known rubber-tired articulated type vehicle having an engine 28. Work function area 30 is of any suitable construction to provide power steering for the vehicle. In addition to motors 32 and 34, work function area 30 includes a suitable conventional steering valve 36 to direct the flow of hydraulic fluid selectively to the piston rod or head ends of the motors 32 and 34 and to exhaust the fluid from the opposite end of the motors and thereby steer the vehicle. When steering wheel 38 is rotated in one direction, fluid flows from input line 39, through valve 36 to motors 32 and 34. Fluid enters the motors through the line 40 and branches 42 and 44 to steer the vehicle in one direction. Conversely, when steering wheel 38 is rotated in the opposite direction, the fluid flows to the opposite ends of motors 32 and 34 through line 46 and branches 48 and 50 to cause steering in the opposite direction. Fluid returning from motors 32 and 34 passes through valve 36, output line 52 and into reservoir 125.

It is understood that the invention is not intended to be limited to the use with an articulated vehicle and may be adapted to steer one or more steerable wheels as desired. Additionally, work function area 30 may be used to provide power for some other function required in the operation of a particular vehicle.

A primary circuit 20 includes a primary pump 22 preferably of the fixed displacement type, such as, for example, a Model No. 22 PL 220 506, manufactured by Hydreco, a Unit of General Signal Corporation. Pump 22 is powered by a motor 28 which is connected to the vehicle. Pump 22 is provided with an output line 24 connected to work function area 30 and a line 26 connected to reservoir 125. A primary check valve 29 is located in output line 24 to prohibit drainage of fluid from work function area 30 through pump 22 in the event of failure of primary circuit 20.

An auxiliary circuit 60 includes an auxiliary pump 62 preferably of the gear type, such as, for example, a Model No. HD 1512 DIBI manufactured by Hydreco, a Unit of General Signal Corporation. Gears 72 are connected to the drive shaft of the vehicle so as to operate pump 62 whenever the vehicle is moving. Pump 62 is provided with lines 68 and 70, leading to valve 80 and serving as pump input and output lines for the pump depending upon the direction of pump rotation.

Figure 2:
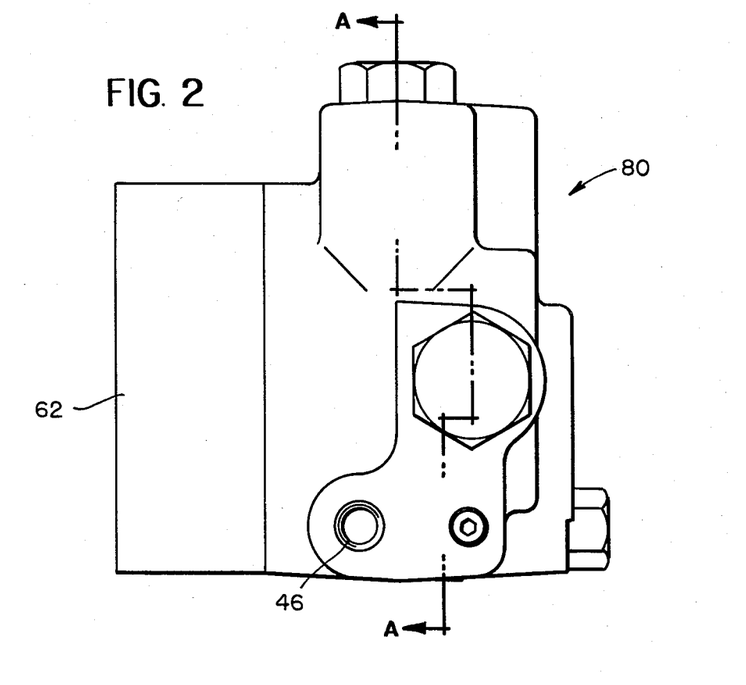
FIG. 2 is a side view of the ground driven pump of the present invention.
Figure 3:
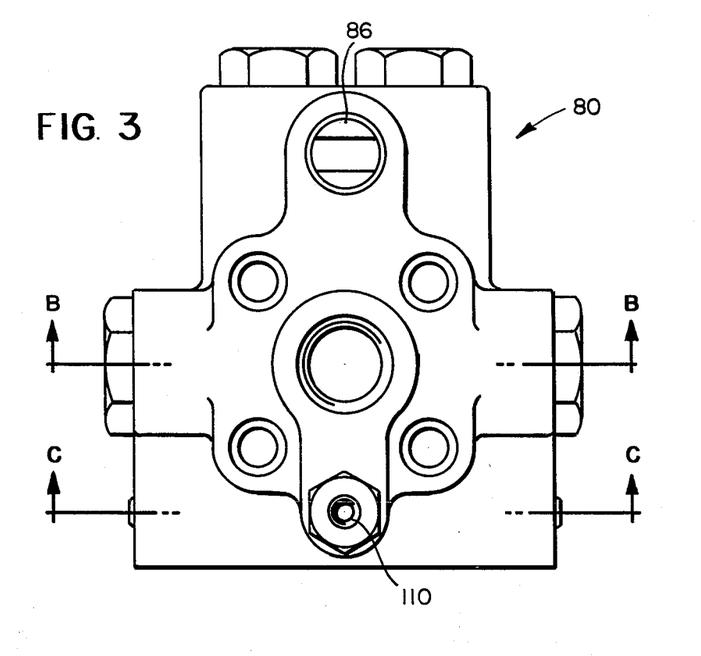
FIG. 3 is a rear view of the ground driven pump of the present invention.
Figure 5:
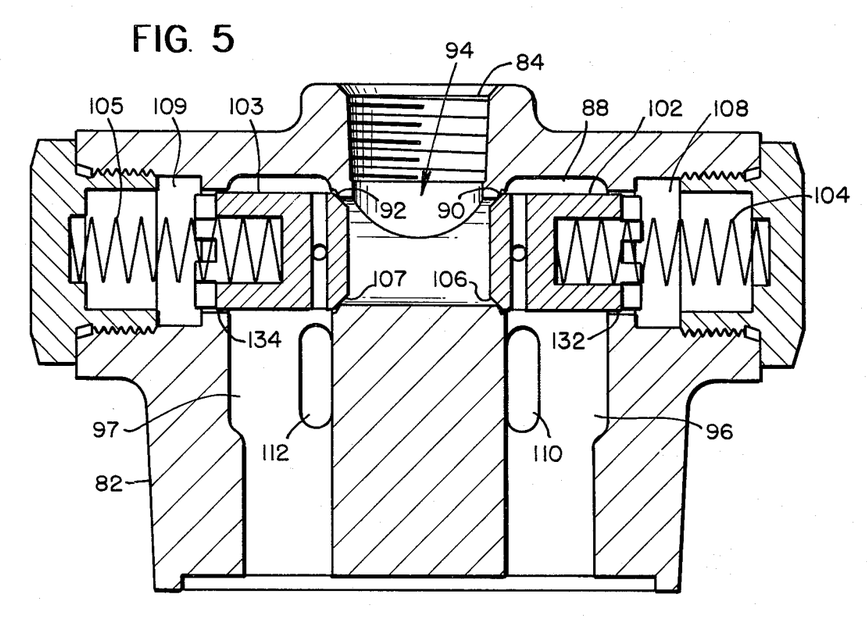
FIG. 5 is a sectional veiw taken along the line B — B of FIG. 3.
Figure 6:
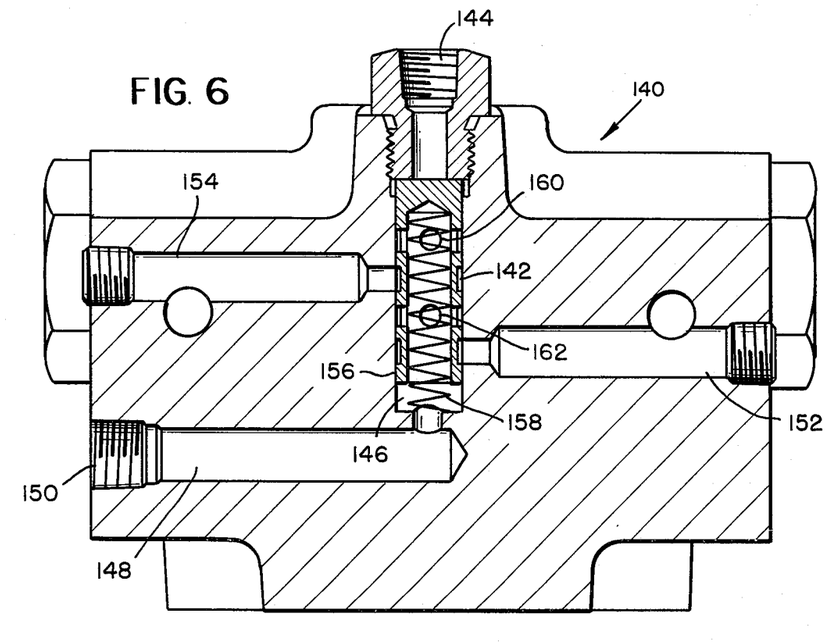
FIG. 6 is a sectional view taken along the line C — C of FIG. 3.

Valve 80, in auxiliary circuit 60, controls fluid flow in both auxiliary output line 64, connected to work function area 30, and auxiliary return line 66, connected to reservoir 125. Referring generally to FIGS. 2 and 6, and more specifically to FIGS. 4 and 5, valve 80 includes a valve body 82 having an inlet port 84 connected to auxiliary return line 66 and an output port 86 connected to auxiliary output line 64. An upper passageway 88 contains opposed valve seats 90 and 92 and a central portion 94. Transverse passageways 96 and 97 provide communication between upper passageway 88 and auxiliary pump ports 98 and 99, respectively. Transverse passageways 96 and 97 each intersect upper passageway 88 on the side of valve seats 90 and 92 opposite central portion 94. Check valve 102 and 103 are located in upper passageway 88 and are normally biased by springs 104 and 105 against valve seats 90 and 92, respectively. Check valves 102 and 103 are cylindrical in shape with frusto-conical portions 106 and 107 on one end. The frusto-conical portions 106 and 107 contact valve seats 90 and 92, respectively, along their surfaces so as to make contact between the tip of check valves which are in communication with central portion 94 and the conical shape, or in other words, intermediate frusto-conical portions 106 and 107. Upper passageway 88 includes cylindrical chambers 108 and 109 in which check valves 102 and 103 reciprocate, respectively. Intermediate passages 110 and 112 are connected to transverse passages 96 and 97, respectively. An output passage 114 connects intermediate passages 110 and 112 to output port 86. A pair of check valves 116 and 117 are located in intermediate passages 110 and 112 and transverse to output passage 114. Check valves 116 and 117 seat against their respective valve seats 118 and 119 to control flow from intermediate passages 110 and 112 to output port 86.

Figure 4:
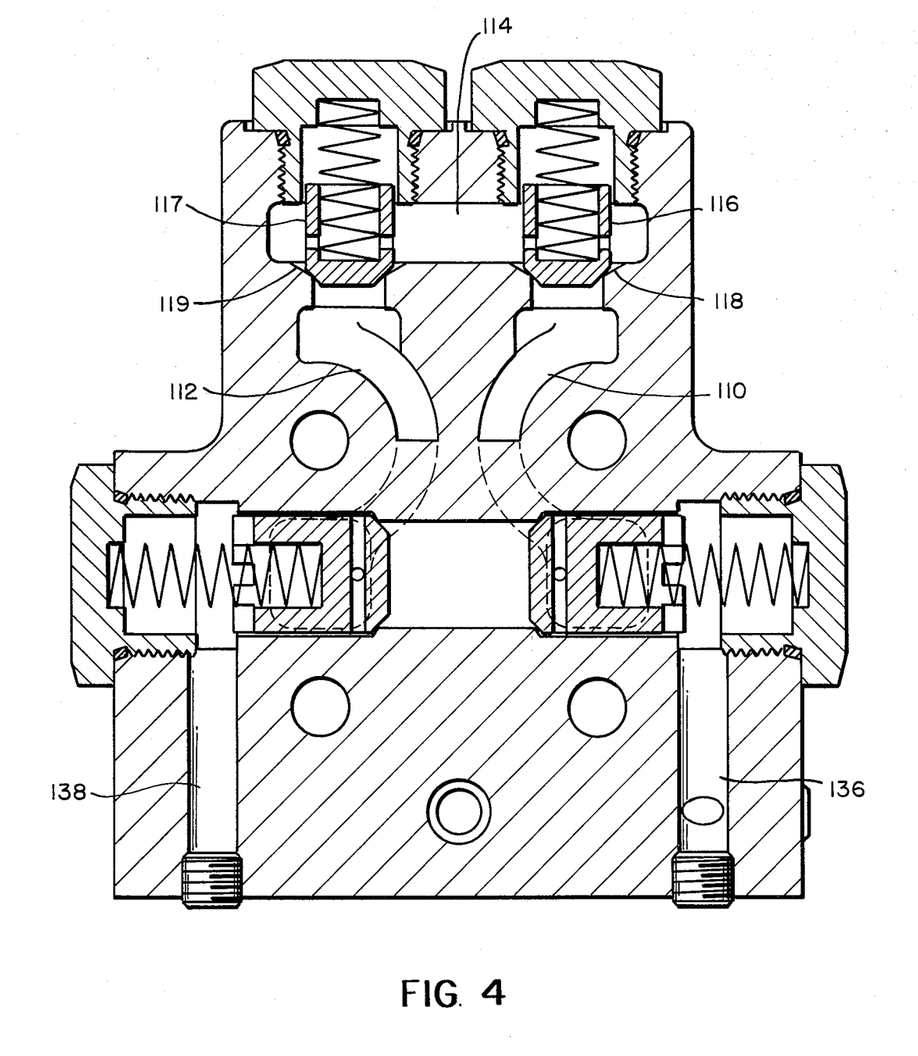
FIG. 4 is a sectional view taken along the line A — A of FIG. 2.

A controlled leakage circuit 130, also referred to as a horsepower loss reduction circuit, is connected to reservoir 125, primary circuit 20, and auxiliary circuit 60. In order to provide a controlled leakage from auxiliary circuit 60, check valves 102 and 103 (located in valve 80) are provided with frusto-conical end portions 106 and 107 as described above. Further, check valves 102 and 103 have a smaller diameter than chambers 108 and 109, and thus, a small leakage of fluid passes through the restrictions 132 and 134 into chambers 108 and 109, respectively. Passages 136 and 138, see FIG. 4, are connected between chambers 108 and 109 and switch valve 140 described hereinbelow. It is understood that the scope of the invention also includes providing restrictions 132 and 134 by other means such as a flat portion on the check valves or a restrictive passageway through valve body 82 between the transverse passages 96 and 97 and chambers 108 and 109, respectively.

The controlled leakage circuit 130 further includes switch valve 140, see FIG. 6, having a passageway 142 connected at one end 144 to signal line 175 and at the other end 146 to a passage 148. Passage 148 has a port 150 on one end which is connected to drain line 164. Lateral passages 152 and 154 communicate with passages 136 and 138 to allow leakage to enter switch valve 140. A plunger 156 reciprocates in passage 142 and is biased by a spring 158 towards end 144. Plunger 156 is hollow and includes plunger ports 160 and 162 to permit fluid to flow from passages 152 and 154 to passage 148. It is understood that the scope of the invention also includes plunger 156 being responsive to a differential pressure. Reservoir 125 may be pressurized or plunger 156 may extend (not shown) below passage 148 and a pressure line from a source of lower pressure than signal line 175 can act on a bottom face of plunger 156 (not shown) in opposition to the pressure from signal line 175.

The controlled leakage circuit 130 also includes check valves 116 and 117 as described above. Although prior art ground drive pump circuits required a device to allow flow to go to a work function regardless of the direction of rotation of the auxiliary pump, it was not necessary to use check valves for this function, and frequently a shuttle valve was used. However, in this embodiment of the present invention the check valve serves both the function of allowing flow to a work function regardless of the direction of rotation of the auxiliary pump as well as stopping any flow to the work function when the primary circuit is providing a predetermined pressure.

The unique features of the present invention can be more fully understood from the following description of its typical operation. Assume that a vehicle includes a primary power steering circuit and an auxiliary power circuit of the present invention. When the vehicle moves and engine 28 operates properly, primary pump 22, see FIG. 1, delivers fluid from reservoir 125 to output line 24. The fluid crosses check valve 29 and enters steering valve 36 via input line 39. By turning wheel 38 in one direction, the fluid passes through line 40, branches 42 and 44, and into motors 32 and 34. The output from motors 32 and 34 returns through branches 50 and 48, line 46, valve 36, and finally through line 52 to reservoir 125. Thus by turning wheel 38, motors 32 and 34 move, and the wheels of the vehicle change their direction with respect to the vehicle. In the case being described, work function area 30 is receiving an adequate amount of power to steer the vehicle and the auxiliary circuit 60 is not needed to provide power to steer the vehicle.

Since the vehicle is assumed to be moving, gears 72, being connected to the drive shaft, are turning and auxiliary pump 62 is supplying fluid to line 68 or 70 depending upon the direction of movement of the vehicle. Referring to FIG. 5, assume that pump 62 is turning in a direction that draws fluid from line 96 and pumps fluid into line 97. For purposes of the discussion, assume that the pump is delivering 20 gallons per minute (gpm) at this time. Pump 62 creates a suction in transverse passageway 96 allowing check valve 102 to open from a greater pressure in central portion 94. Fluid from return line 66 enters inlet port 84, crosses valve seat 90 and flows into passage 96 and through pump line 68. The fluid, delivered to transverse passage 97, acts on a portion of frusto-conical portion 107. Further, the fluid enters passage 112 and acts against check valve 117 which is closed by high pressure fluid from primary circuit 20.

Since the main pump 22 is operating properly, signal line 175 communicates a predetermined pressure (which is greater than the predetermined minimum) which acts against the top surface of plunger 156 to bias the plunger against the force of spring 158. This communicates chamber 109 to reservoir 125.

At the same time, restricted orifice 134 permits a leakage to pass into chamber 109. The leakage passes through passageway 138 into switch valve passage 154 into port 160, passage 148, and line 164 which communicates with reservoir 125.

Since chamber 109 is drained to reservoir 125 through valve 140, the differential pressure across orifice 134 allows pressure to build in passage 97 and work against a portion of 107 which causes check valve 103 to open against the bias of spring 105. The quantity of leakage flow is determined by the ratio of area between the orifice formed between seat 92 and face 107 and the orifice 134. For the purpose of this discussion, one gpm is the leakage flow which passes across orifice 134.

At this time, the remaining 19 gpm crosses check valve 103, into central passage portion 94, and is recirculated into pump 62. However, the pump 62 is still drawing 20 gpm and the other 1 gpm must be made up from another source. The 1 gpm is drawn from reservoir 125 and passed through return line 66 into passage 68. There it joins the 19 gpm, recirculating through valve 60, and 20 gpm is available for the pump.

It is extremely important to draw off some of the pump output flow in order to dissipate heat being developed in pump 62. A ground driven pump becomes hot since it is constantly turning and creating friction. It is important to stop overheating of the pump as it decreased the life expectancy of a pump. In practice, it has been found that a one gpm leakage provides adequate cooling for the auxiliary pump disclosed above. As the area of restrictions 132 and 134 decreases the amount of cooling decreases while enlarging the area of the orifices increases the amount of cooling.

In the situation where the vehicle moves in the opposite direction the fluid flow through auxiliary pump circuit 60 and controlled leakage circuit 130 is reversed to that described above. The reversal of rotation of pump 62 does not change the functions of the various components in any other way.

The next situation to be described is when primary circuit 20 does not deliver the proper amount of fluid to work function area 30 and the operator is not able to steer the vehicle. In this case, the pressure in signal line 175 drops to a low value and plunger 156 of switch valve 140 is biased by spring 158 to the position illustrated in FIG. 6. The plunger now blocks lateral passages 152 and 154 and the leakage flow from the back or check valve 103 (assuming the vehicle is moving in the direction described above) cannot pass through switch valve 140 into reservoir 125. Further, check valve 103 is biased by spring 105 from passing fluid into passage 94. Thus, pump 62 receives its required supply of fluid from reservoir 125.

Since auxiliary pump 62 is supplying fluid to transverse passageway 97 of valve 80, the fluid enters passageway 112, crosses check valve 117 (see FIG. 4) and enters output line 64. The fluid is able to open check valve 117 because the fluid in passageway 112 builds pressure and pressure in line 64 from primary pump 22 under the assumed operating condition is not high enough to close valve 117.

Work function area 30 is again receiving the required power to operate motors 32 and 34. Since no leakage is passing through switch valve 140, the entire 20 gpm from auxiliary pump 62 is delivered to steering valve 36 until that time when primary circuit 20 is again operating properly. If the vehicle is moving in the opposite direction from the one assumed in the above description, the fluid from pump 62 passes through passage 110, across check valve 116, and into output line 64 to thereby supply work function area 30 as described above.

Figure 7:
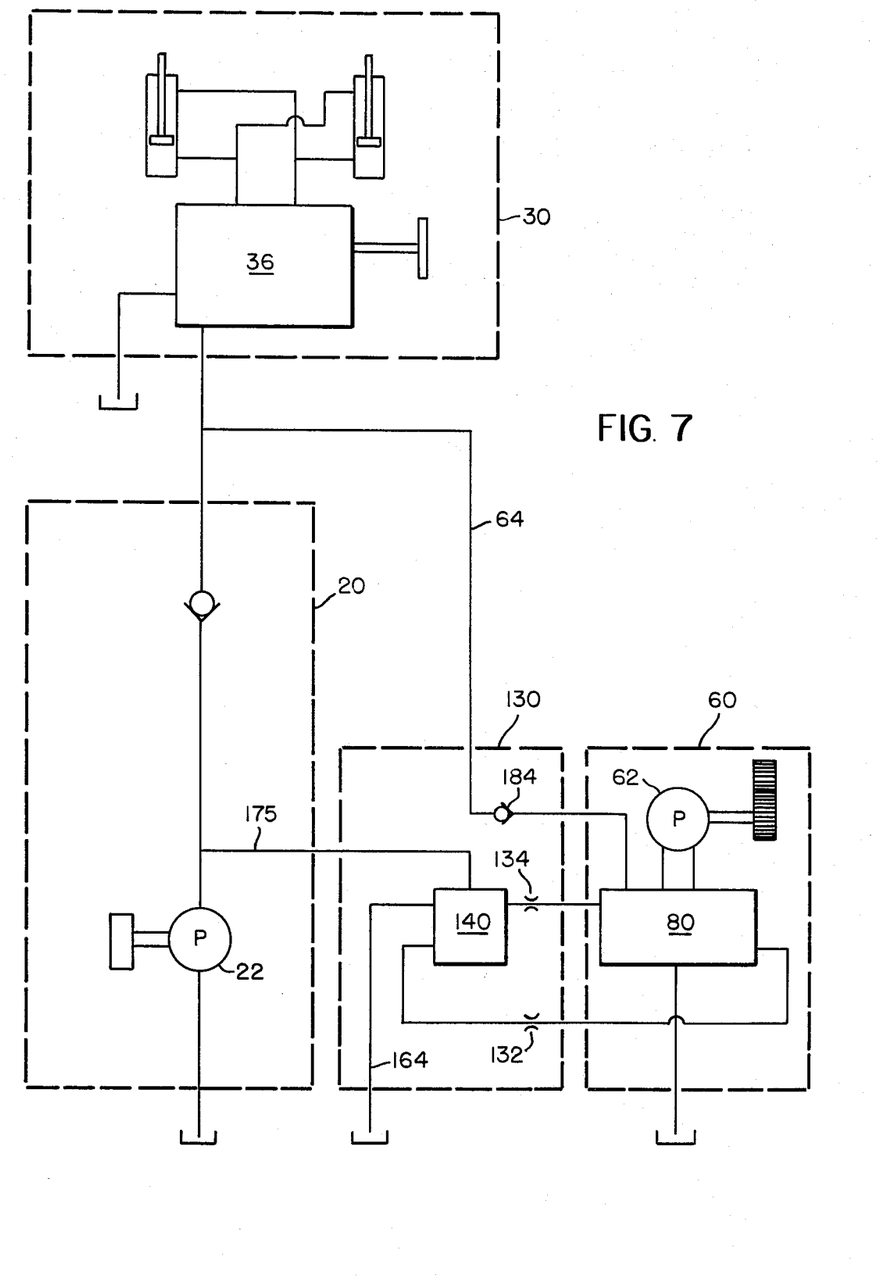
FIG. 7 is a schematic illustration of a second embodiment of the present invention.
Figure 8:
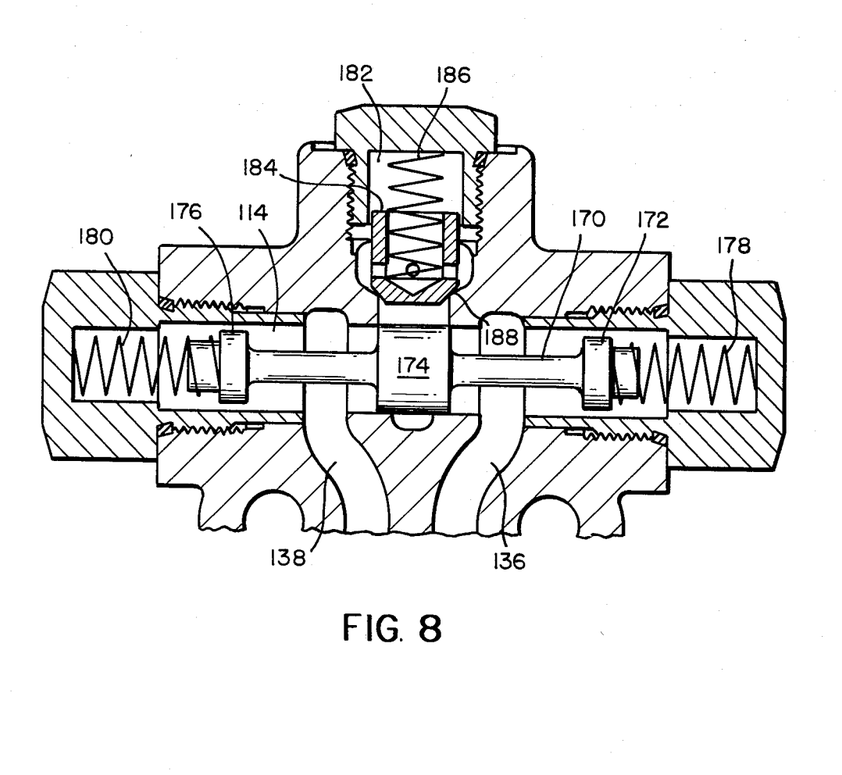
FIG. 8 is a sectional view illustrating a portion of the ground driven pump used in the second embodiment of the present invention.

A second embodiment of the present invention, as depicted in FIGS. 7 and 8, is similar to the first embodiment except for the details of valve 80 and a portion of the controlled leakage circuit 130. Parts of the second embodiment which are like the first embodiment receive the same numerals.

Referring to FIG. 8, a shuttle plunger 170 with three lands 172, 174, 176 is slidably received within passage 114. Plunger 170 is biased by springs 178 and 180 which act against lands 172 and 176 to keep plunger 170 in a central position. Passage 64 includes a check valve 184 which is biased against a valve seat 188 by a spring 186. A passage 182 intersects passage 114 and receives a shuttle check valve 184. A spring 186 biases valve 184 against a seat 188. Passage 182 is connected to output line 64 and work function area 30 as best seen in FIG. 7.

The embodiment of the invention shown in FIG. 7 operates the same way as the first embodiment explained above with the exception of the specifics of valve 80 and check valve 184. In the event that primary circuit 20 is operating properly, switch valve 140 allows a leakage flow from valve 80 to reservoir 125. Fluid also recirculates through auxiliary pump 62 and enters passage 138 to act against land 174 and bias shuttle plunger 170 against the force of spring 178. The fluid then acts against shuttle check valve 184 but the pressure in line 64, see FIG. 7, in combination with spring 186 does not permit valve 184 to open.

If the auxiliary pump 62 rotates in the opposite direction, fluid enters line 136 and moves shuttle valve 170 toward the left against spring 180. Again, shuttle check valve 184 remains closed for the reasons described above. If primary circuit 20 was not providing the proper amount of fluid, shuttle check valve 184 opens and work function area 30 receives fluid as in the first embodiment.

One skilled in the art will realize that there has been disclosed a system for providing power that requires a minimum of horsepower loss when the auxiliary system is not required, is a compact installation, is efficient, is inexpensive to manufacture, and is easy to install.

While there has been described what is at present considered a preferred embodiment of the invention, it will be obvious to those skilled in the art that changes and modifications may be made therein without departing from the invention, and it is, therefore, aimed in the appended claims to cover all such changes and modifications as followed in the true spirit and scope of the invention.

What is claimed is:

1. A system for providing auxiliary power which comprises:
   a primary means including a primary pump, an output line to provide primary power to a work function means, and a return line;
   an auxiliary means including an auxiliary pump, an output line to provide said auxiliary power, a return line and a valve means for controlling fluid flow in said output and return lines of said auxiliary means;
   a reservoir connected to said primary return line and said auxiliary return line;
   a controlled leakage means for cooling said auxiliary pump being connected to said auxiliary means, said reservoir and said primary means and being responsive to fluid pressure from said primary means for directing a portion of auxiliary output fluid to said reservoir when the primary means provides a predetermined pressure and directing a desired amount of said auxiliary output fluid to said auxiliary output line when said primary means provides less than said predetermined pressure.

2. The system defined in claim 1, wherein said controlled leakage means directs substantially all of said auxiliary output fluid to said auxiliary output line when said primary means provides less than said predetermined pressure.

3. The system defined in claim 2, wherein said controlled leakage means includes a switch valve means for causing said valve means to direct a portion of auxiliary pump output fluid to said reservoir and to recirculate the remainder of said pump output fluid through said auxiliary pump when said primary means provides a predetermined pressure and for directing substantially all of said auxiliary pump output fluid to said auxiliary output line when said primary means provides less than said predetermined pressure.

4. The system defined in claim 2, wherein said controlled leakage means further includes restrictive orifice means for directing said portion of auxiliary output fluid from said valve means through said switch means and to said reservoir when said primary means provides said predetermined pressure.

5. The system defined in claim 3, wherein said controlled leakage means further includes restrictive orifice means for directing said portion of auxiliary output fluid from said valve means through said switch means and to said reservoir when said primary means provides said predetermined pressure.

6. The system defined in claim 2, wherein said controlled leakage means includes a check valve means for preventing flow from said auxiliary output line to said work function means when said primary means provides said predetermined pressure.

7. The system defined in claim 2, wherein said work function means receives fluid from said primary means when said primary means provides said predetermined pressure and receives fluid from said auxiliary means when said primary means provides less than said predetermined pressure.

* * * * *